May 13, 1952  R. G. HANNEMAN ET AL  2,596,148
BAFFLE CONSTRUCTION FOR OIL BATH FILTERS
Filed April 17, 1947
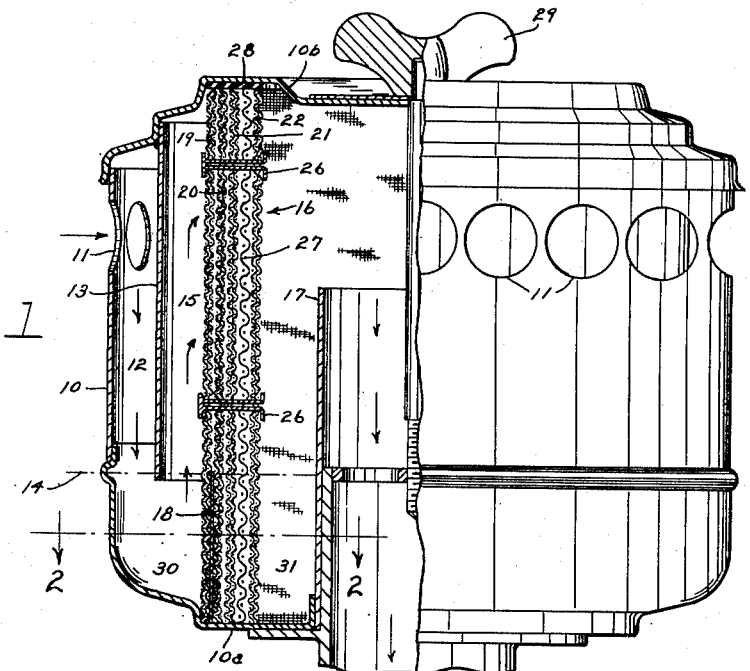
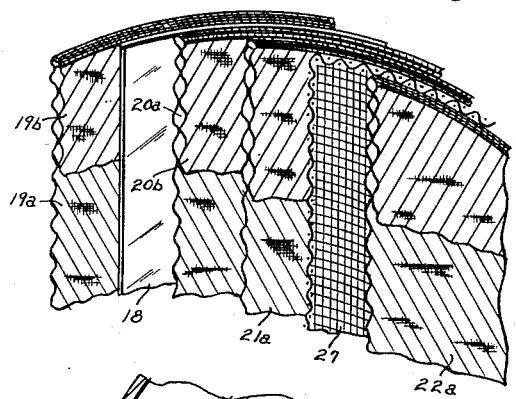
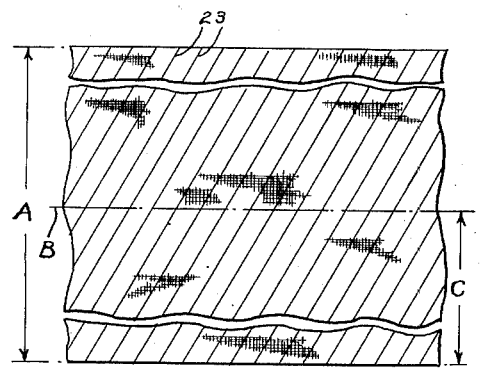
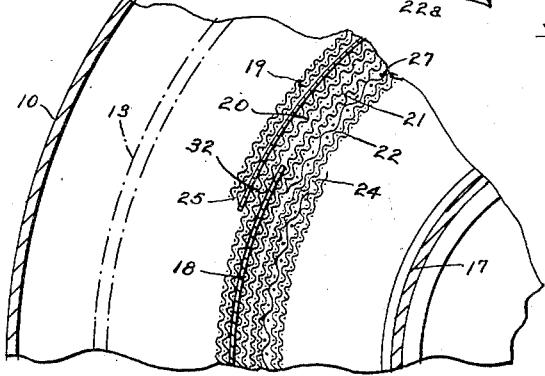
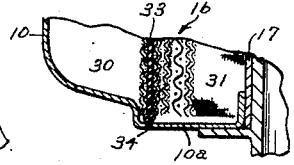
INVENTORS
ROBERT GORDEN HANNEMAN
JACOB K. BRIXIUS
By Hyde, Meyer, Baldwin & Doran
ATTORNEYS Patented May 13, 1952

2,596,148

UNITED STATES PATENT OFFICE 2,596,148

BAFFLE CONSTRUCTION FOR OIL BATH FILTERS

Robert Gorden Hanneman, Shaker Heights, and Jacob K. Brixius, Cleveland, Ohio, assignors to Air-Maze Corporation, Cleveland, Ohio, a corporation of Delaware Application April 17, 1947, Serial No. 742,016

4 Claims. (Cl. 183—15)

This invention relates to improvements in baffle construction for a liquid washed filter.

An object of the present invention is to provide an efficient baffle means for a filter of the type described which is adapted to be very cheaply constructed and assembled.

Other objects and advantages of the present invention will be apparent from the accompanying drawings and description and the essential features will be set forth in the appended claims.

In the drawings,

Fig. 1 is a view partly in side elevation and partly in central section showing one embodiment of my invention;

Fig. 2 is an enlarged fragmental sectional view taken along the line 2—2 of Fig. 1;

Fig. 3 is a perspective view taken near the bottom of the filtering element of Fig. 1 with parts broken away to more clearly show the construction;

Fig. 4 is a plan view of a strip of screen material illustrating the manner of crimping and folding the same to provide a filter element; while Fig. 5 is a fragmental sectional view like the lower left-hand corner of Fig. 1, showing a modification.

We have shown our invention as applied to a well known type of liquid washed filter often referred to as the oil bath type. A dirty air stream enters the housing 10 at the openings 11 passing downwardly through an annular chamber 12 outside a skirt member 13. The bottom of the housing in the form of an upwardly-opening bowl is filled with oil or other suitable washing liquid to the level of the dot-dash line 14. The dirty air stream passes beneath the skirt 13 picking up oil as it moves and then travels upwardly inside the skirt 13 in the annular chamber 15. The air then passes radially inwardly through the filter element 16 being cleaned thereby after which it is discharged through the outlet 17.

Baffle means is normally provided substantially in the position of the baffle 18 which is for the purpose of preventing air flow radially inwardly until after the air stream has been directed upwardly along the outer surface of the filter element 16. This baffle 18 normally ends at or slightly above the liquid level 14. The present invention provides a novel manner of forming the baffle means 18 using a layer of metal foil or tthe like which preferably is rolled in with the material forming the filter element 16 and extends to a point of contact with the bottom 10a of the housing. Thus, the baffle means 18 provides an imperforate wall to deflect the air stream upwardly while the bottom of the baffle means is sealed sufficiently by its contact with the housing bottom 10a and by the residual oil at that zone so that the device works very efficiently when in use.

The filtering element 16 may be formed in various ways and the specific description used herein is not intended in any limiting sense but merely as illustrative of any one of various constructions which may be used. In the form shown, the filter element comprises four double layers of wire screen, say of approximately 16 x 16 inch mesh. These layers are numbered 19, 20, 21 and 22. An easy manner of forming such a double layer is somewhat diagrammatically illustrated in Fig. 4. A sheet of screen material having a dimension A which is twice the vertical height of the filter element 16 is crimped along the parallel diagonal lines 23 with crimps say three thirty-seconds of an inch to three sixteenths of an inch in depth, depending upon the size of the filter. The sheet of crimped screen is then folded along the dot-dash line B so as to provide a double layer of screen wire with the crimps 23 crossing each other in adjacent layers. As shown in Fig. 3, these two superimposed portions of layer 19 are marked 19a and 19b and similar reference characters have been placed upon the other layers. An elongated strip of double screen so formed and having the width C as indicated in Fig. 4 is then rolled upon itself spirally, as indicated in Fig. 2 beginning at the point 24 and ending at the point 25. Thus, a single continuous spiral provides the four layers 19, 20, 21 and 22 mentioned previously. A simple way of incorporating the baffle means 18 is to provide a strip of foil or the like of the proper width and roll it into the spiral just inside the outermost double layer. Preferably, the ends of the baffle means 18 are slightly overlapped, as indicated in Fig. 2. This effectively prevents the air stream blowing directly radially inwardly at tthe bottom of the filter element. Instead, the air is compelled to flow upwardly in the annular chamber 15. The filter element is then held in position by means of staples 26 or other suitable securing means.

Preferably but not necessarily, the filter element is stiffened by rolling in an intermediate layer 27 of stiff hardware cloth or the like, say one having 8 x 8 inch mesh. This adds greatly to the vertical stiffness of the filter element.

The operation of our invention should now be apparent. The filter element 16 constructed as described is placed within the housing 10 in the position shown in Fig. 1 with the baffle means 18 touching the bottom of the housing 10a. A gasket 28 is applied around the top of the filter element and the housing top 10b is then secured in the position shown by means of the thumb bolt 29. The baffle means 18 is thus always properly positioned because the positioning is automatic with the placing of the filter element 16 within the housing 10. As the air stream passes beneath the skirt 13 and turns upwardly, it picks up oil out of the reservoir 30 and additional oil is picked up because the layer 19 of screen outside the baffle means 18 gives a rough oil coated surface from which the air readily picks up additional oil. Those skilled in this art will appreciate that the oil level builds up radially inwardly of the filter element 16 and near the bottom thereof. Some of this oil will flow outwardly over the top of the baffle means 18 and downwardly over the baffle and the screen layer 19. At the same time, equalization of the oil level in the chambers 30 and 31 is facilitated when the engine is shut down because of the opening at the point 32 where the ends of the baffle means overlap. Through the gap there formed in the spiral construction, the oil may slowly escape from the higher-level chamber 31 to the lower-level chamber 30 until the oil is at the same level in both chambers.

An additional advantage may be obtained by making the baffle 18 of rubber, or similar flexible sealing material, as indicated at 33 in Fig. 5. A strip of oil-resisting rubber substitute or the like is rolled into the filter element 16 exactly like the manufacturing operation described previously. Preferably, the lower edge of the strip 33 extends slightly below the lower edge of the filter element, so that, when the parts are assembled, the strip 33 will press against the bottom 10a as shown (with the rubberlike material slightly deformed by pressure) at 34 in Fig. 5. In this case the baffle means 33 provides all of the advantages ascribed to the baffle means 18, and in addition it provides a seal against undesirable by-passing of air beneath the filter element from chamber 30 to chamber 31.

What we claim is:

1. In a liquid bath filter comprising a housing having a bottom wall supporting a liquid bath reservoir and having a filter element composed of a plurality of foraminous layers and having means for directing gaseous flow through said filter element, said element resting upon said bottom wall, the improvement consisting of a substantially impervious baffle sheet supported between two of said layers, said sheet extending from said bottom wall upwardly substantially to the normal liquid level of said reservoir.

2. The combination of claim 1 wherein said sheet is of flexible sealing material having sealing engagement with said bottom wall.

3. In a liquid bath filter comprising an upwardly opening bowl, a liquid bath in the lower portion of said bowl, an annular filter element having a plurality of foraminous layers and upstanding in said bowl with its axis substantially vertical, and housing means providing an inlet and an outlet and partition means compelling flow of a treated gaseous stream between said inlet and outlet through said bath and through said filter element generally radially thereof; the combination therewith of a baffle formed of a sheet of substantially gas-impervious material held between two adjacent layers of said element solely by engagement with said layers, said baffle extending completely around said annular element and from the bottom of said bowl upwardly to the normal level of said liquid bath.

4. The combination of claim 3 wherein said baffle is of flexible material adapted to form a seal, said baffle sheet extending below the lower end of said filter element and engaging the bottom wall of said bowl in sealing engagement.

ROBERT GORDEN HANNEMAN.
JACOB K. BRIXIUS.

REFERENCES CITED

The following references are of record in the file of this patent:

UNITED STATES PATENTS

| Number | Name | Date |
|--------|------|------|
| 646,780 | Wood | Apr. 3, 1900 |
| 1,367,701 | Haynes | Feb. 8, 1921 |
| 1,640,291 | Perkins | Aug. 23, 1927 |
| 1,918,006 | Walton | July 11, 1933 |
| 1,962,532 | Strong | June 12, 1934 |
| 2,190,683 | Schaaf et al. | Feb. 20, 1940 |
| 2,190,886 | Schaaf et al. | Feb. 20, 1940 |
| 2,239,731 | Neumann | Apr. 29, 1941 |
| 2,244,792 | Miller | June 10, 1941 |
| 2,341,771 | Hagar | Feb. 15, 1944 |
| 2,427,525 | Glanzer | Sept. 16, 1947 |

FOREIGN PATENTS

| Number | Country | Date |
|--------|---------|------|
| 258,271 | Great Britain | May 19, 1927 |